(12) United States Patent
Proulx et al.

(10) Patent No.: US 9,118,502 B2
(45) Date of Patent: Aug. 25, 2015

(54) AUTO VPN TROUBLESHOOTING

(75) Inventors: Denis Armand Proulx, Ottawa (CA); Reda Laichi, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 457 days.

(21) Appl. No.: 12/485,549

(22) Filed: Jun. 16, 2009

(65) Prior Publication Data

US 2010/0315955 A1    Dec. 16, 2010

(51) Int. Cl.
*H04L 12/46* (2006.01)
*H04L 12/24* (2006.01)
*H04L 12/701* (2013.01)

(52) U.S. Cl.
CPC .......... *H04L 12/462* (2013.01); *H04L 12/4641* (2013.01); *H04L 41/0631* (2013.01); *H04L 45/00* (2013.01)

(58) Field of Classification Search
USPC .................................................. 370/254–256
See application file for complete search history.

(56) References Cited

U.S. PATENT DOCUMENTS

| | | | |
|---|---|---|---|
| 7,818,283 B1* | 10/2010 | Bajpay et al. | 707/E17.005 |
| 8,095,581 B2* | 1/2012 | Stobbs et al. | 707/934 |
| 2002/0027887 A1* | 3/2002 | Moriya | 370/256 |
| 2003/0022666 A1* | 1/2003 | Sato | 455/423 |
| 2003/0069010 A1* | 4/2003 | Eravelli | 455/423 |
| 2004/0154001 A1* | 8/2004 | Haghighat et al. | 717/130 |
| 2005/0149804 A1* | 7/2005 | Hiraide | 714/738 |
| 2008/0031144 A1* | 2/2008 | Kawamoto et al. | 370/242 |
| 2010/0120415 A1* | 5/2010 | Urquhart et al. | 455/424 |

* cited by examiner

*Primary Examiner* — Brandon Renner
(74) *Attorney, Agent, or Firm* — Kramer & Amado, P.C.

(57) ABSTRACT

The invention is directed to providing a method and system for automatically determining a root cause of a failure in a packet switching telecommunications network using IP/MPLS protocols and having Virtual Private Network (VPN) services such as VLL, VPLS, VPRN.

19 Claims, 4 Drawing Sheets

AUTO VPN TROUBLESHOOTING

FIELD OF THE INVENTION

The invention is directed to packet switching communication networks, particularly automatic troubleshooting of network failures.

BACKGROUND OF THE INVENTION

Troubleshooting current telecommunications systems is typically performed manually. The manual diagnostic process can be very time consuming. This process also requires a high level of skill on the part of an operator as well as knowledge of the underlying technologies and specific configuration of the particular network.

More specifically, the time to troubleshoot a customer service on an IP/MPLS network takes too long. The IP/MPLS network service provider needs to troubleshoot a Customer VPN Service when there is a failure on the service. It could be related to Node failures, Cards, Ports, link, L2 interface, L3 interfaces, routing protocol failure, miss configuration on the Customer premise. In current networks, this would typically be done manually using the network management systems (NMS) and router command line interfaces (CLI). Even with highly skilled operators, the current methods have limitations of visibility of correlation between certain network elements.

Thus there remains a need for improved systems and methods for troubleshooting telecommunications systems.

SUMMARY OF THE INVENTION

One aspect of the invention is directed to providing a method of determining at a service platform, a root cause of a failure in a packet switching telecommunications network. The method comprises steps of: selecting a service access point (SAP); constructing, from a network-aware management system, a network topology map relative to the SAP; analyzing the state of the SAP; analyzing a physical access port associated with the SAP; analyzing a virtual private network (VPN) service hosting the SAP; analyzing a service binding associated with the VPN service; analyzing a layer 2 access interface associated with the binding; analyzing a layer 3 access interface associated with the binding; and displaying a root cause analysis of the failure.

In some embodiments of the invention, the step of analyzing the state of the SAP comprises: determining an administrative state of the SAP; determining an operational state of said SAP; and determining an alarm state of the SAP.

In some embodiments of the invention, the step of displaying a root cause analysis comprises displaying a cause for a failure based on a hierarchical analysis of detected failures for the SAP.

In some embodiments of the invention, the step of displaying a root cause analysis comprises selecting the lowest level failure from a hierarchical list of detected failures for the SAP.

In some embodiments of the invention, the step of selecting said SAP comprises displaying to a user at the service platform, a list of circuit identifiers configured on the network.

In some embodiments of the invention, the step of constructing a network topology map comprises steps of: finding the virtual service hosting said SAP; finding the service binding correlating the SAP to the virtual service; finding the service tunnel used by the service binding; finding the MPLS/LSP used by the service tunnel; finding the layer 2 access interface using the service binding and the service tunnel; finding the layer 3 access interface using the service binding and the service tunnel; finding a VPRN service hosting the layer 3 access interface; finding all the VPRN service sites for the VPRN service; and finding all the L3 access interfaces for the VPRN service.

Another aspect of the invention provides a system for providing a root cause of a failure in a packet switching telecommunications network. The system comprises: a network-aware management system in communication with the network; a service platform in communication with the network-aware management system; a user interface for selecting a service access point (SAP); a service application on the service platform configured to execute steps of: constructing a network topology map relative to the SAP; analyzing the state of the SAP; analyzing a physical access port associated with the SAP; analyzing a virtual service hosting the SAP; analyzing a service binding associated with the virtual service; analyzing a layer 3 access interface associated with the binding; and displaying a root cause analysis of the failure.

In some embodiments service application is configured to construct a network topology map by executing steps of: finding the virtual service hosting the SAP; finding the service binding correlating the SAP to the virtual service; finding the service tunnel used by the service binding; finding the MPLS/LSP used by the service tunnel; finding the layer 3 access interface using the service binding and the service tunnel; finding a VPRN service hosting the layer 3 access interface; finding all the VPRN service sites for the VPRN service; and finding all the L3 access interfaces for said VPRN service.

Yet another aspect of the present invention provides a program storage device readable by a machine, tangibly embodying a program of instructions executable by the machine to perform the method steps described above.

Advantageously, embodiments of the invention can be used to troubleshoot complex telecommunications systems in a timely and practical manner.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

Figure 1:
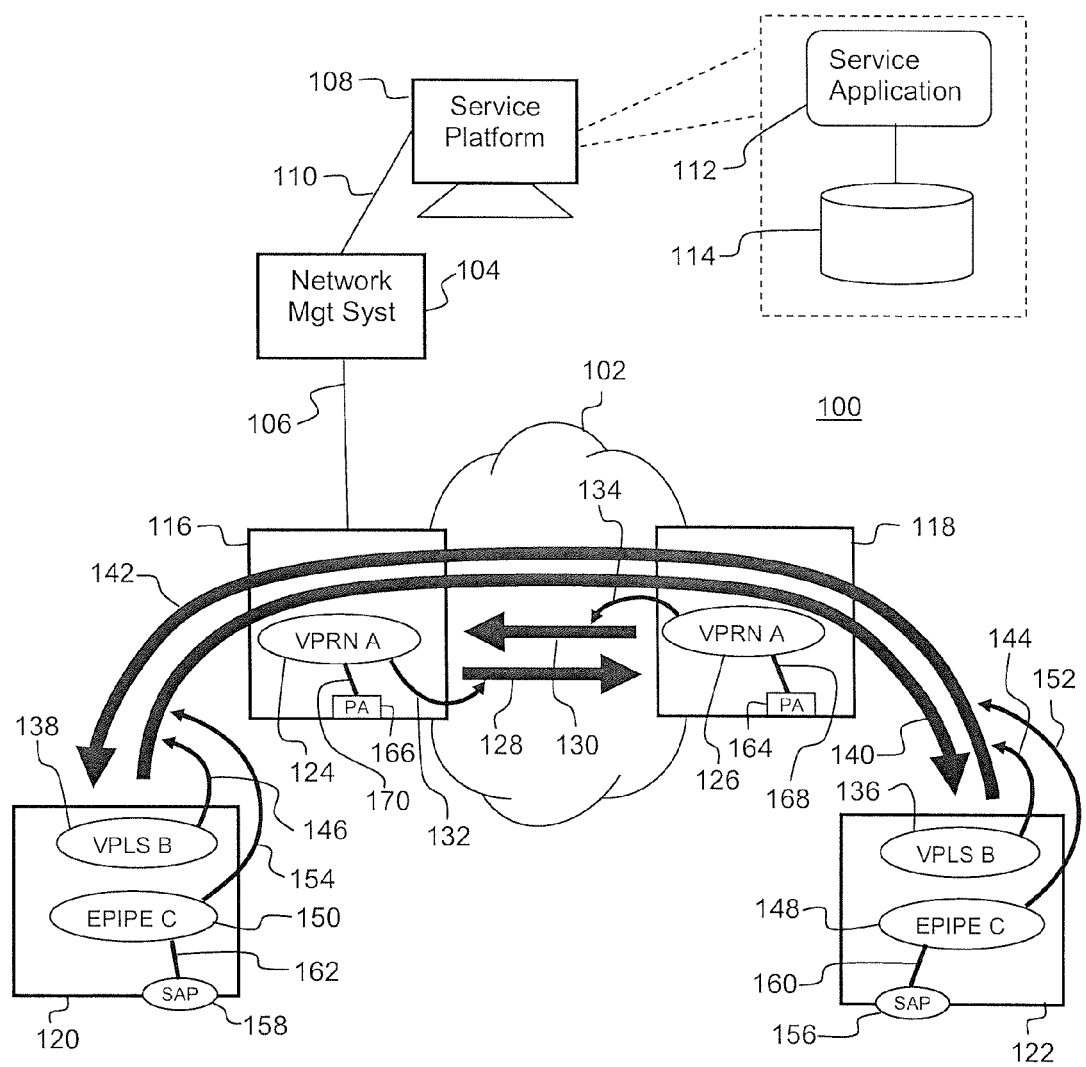
FIG. 1 illustrates an embodiment of a packet switching network configuration for troubleshooting virtual private networks.

Referring to FIG. 1, a network configuration 100 for providing virtual private network services over an Internet Protocol (IP)/Multi-Protocol Label Switched (MPLS) network 102 is controlled by network management system 104 via link 106. Service platform 108 provides additional OAM services including troubleshooting and diagnostics. The service platform 108 runs a service application software 112. Instructions for the service application software and diagnostic results are stored on memory 114 which could be a hard disk drive, flash memory or other data storage means as would be readily apparent to persons skilled in the art.

The network configuration 100 has various network elements or nodes including provider edge routers 116, 118, connected to MPLS network 102 and customer edge routers 120, 122, connected by links (not shown) to the provider edge routers 116 and 118. Service tunnels or Service Distribution Path (SDP) 128, 130 provide a logical layer 2 forwarding relationship between network elements 116, 118. The SDPs 128, 130 provide a logical way to direct traffic from one service site to another through a unidirectional (one-way) service tunnel. The endpoints for the tunnel are the system addresses of each network element (116, 118) at each end of the SDP (128, 130). The underlying tunnels are configured using Dynamic Label Switched Paths (LSP). Virtual Private Routed Network (VPRN) services 124 (VPRN "A") and 126 (VPRN "A") are configured on nodes 116 and 118. VPRN "A" 126 is bound to SDP 130 via binding 134 and VPRN "A" 124 is bound to SDP 128 via binding 132. VPRN "A" 124 is also bound to physical access port 166 via binding 170 and similarly, VPRN "A" 126 is also bound to physical access port 164 via binding 168.

SDP service tunnels 140 and 142 provide encapsulation for selected traffic between customer edge routers 120, 122 in a similar manner to how SDPs 128 and 130 provide encapsulation for selected traffic on provider edge nodes 116 and 118. Virtual Private LAN Service (VPLS) 138 (VPLS "B") is configured on customer edge node 120 and another instance of VPLS B 136 is configured on customer edge node 122. VPLS "B" 138 is bound to SDP 140 via binding 146 and VPLS "B" 136 is bound to SDP 142 via binding 144.

Virtual Leased Line Ethernet pipe (VLL Epipe) 150 (Epipe "C") is configured on customer edge node 120 and another instance of Epipe "C" 148 is configured on customer edge node 122. Epipe "C" 150 is bound to SDP 140 via binding 154 and Epipe "C" 148 is bound to SDP 142 via binding 152. Epipe "C" 150 is also bound to Service Access Point (SAP) 158 via binding 162 and similarly, Epipe "C" 148 is also bound to SAP 156 via binding 160. SAPs identify customer interface points for a service on a service site.

As can be inferred from FIG. 1, packet switching networks can be complex, with multiple layers of service and multiple interconnections. In large networks with many nodes, the complexity of the network and the multiple interconnections can be very complex, to the point where manual troubleshooting and diagnostics become unmanageable.

Figure 2:
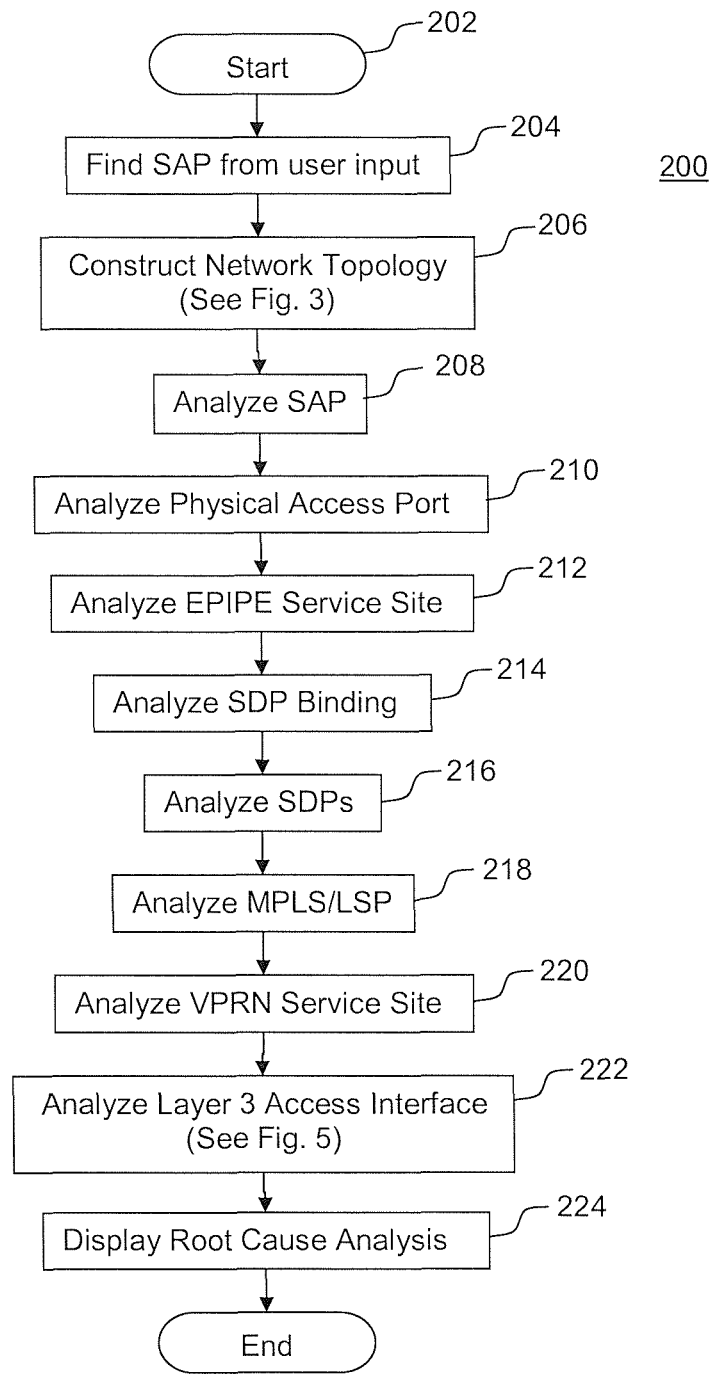
FIG. 2 illustrates an embodiment of a method for determining a root cause of a failure in the embodiment of the network depicted in FIG. 1.

FIG. 2 illustrates a flowchart of an embodiment of a method 200 for determining a root cause of a failure in the network depicted in FIG. 1. This automated process takes user input at step 204 to select an SAP. The user can type an identifier (such as a circuit ID) for an SAP or select from a menu presenting a list pre-populated with all configured SAPs on the network supported by the service platform 108. Other techniques for selecting, such as filtering the pre-populated list based on user input can be used, as would be readily apparent to persons skilled in the art.

At step 206, the service application 112, constructs the network topology relevant to the selected SAP. This would include identifying the network elements or nodes on which the SAP is configured, VPNs, Epipes, VPLSs, VPRNs and other services bound to the SAP, the bindings and the SDPs and transport tunnels over which the services are routed. The service application 112 on the service platform 108 can use the resources of the network management system 104. Further details regarding constructing the network topology will be discussed below, with reference to FIG. 3.

At step 208, the SAP is tested. The service application 112 checks the administrative state and operational state, and checks alarms of the selected SAP by initiating diagnostic commands to the network management system 104 and the relevant nodes 116, 118, 120, 122 as appropriate.

At step 210, the physical access port is tested. This is especially important if the operational status of SAP is "Down". The service application 112 checks the administrative state and operational state, checks alarms, and checks MTU size associated with the physical access port. Physical alarms such as "Equipment Down" will be retrieved when applicable.

At step 212, the Epipe service site is analyzed. The service application 112 checks the administrative state and operational state, checks alarms, and checks MTU size associated with the Epipe service. Epipes are one example of a virtual private network (VPN) service. The present invention contemplates testing and analysis of other types of VPN services such as Virtual Leased Lines (VLLs), Apipe (ATM pipe) and Fpipe (Frame Relay pipe), as would be apparent to persons skilled in the art At step 214, the binding between the VPN service and the SDP service tunnel is analyzed. The service application 112 checks the administrative state and operational state, checks alarms associated with the SDP binding. If the SDP binding is down, then the service application further analyzes the SDP service tunnels.

At step 216, the SDP service tunnel is tested. The service application 112 checks the administrative state and operational state, checks alarms, and checks MTU size associated with the SDP service tunnel. If the SDP is down then the MultiProtocol Label Switching/Label Switched Path (MPLS/LSP) used by this SDP is analyzed at step 218. The service application 112 checks the administrative state and operational state, and checks alarms, associated with the MPLS/LSP.

At step 220, the VPRN service site is analyzed. The service application 112 checks the administrative state and operational state, checks alarms, including Route Distinguisher (RD) and Autonomous System Number (ASN) associated with the VPRN service site.

At step 222, the layer 3 access interface is analyzed. The service application 112 checks the administrative state and operational state, checks alarms, and IP address associated with the layer 3 access interface. Further details regarding analyzing the layer 3 access interface will be discussed below, with reference to FIG. 4.

At step 224, the service application 112 analyzes the results of the foregoing testing and analysis and displays to the user at the service platform 108, a root cause for the failure based on the hierarchical analysis of detected failures for said SAP as described above. The root cause is determined by selecting the lowest level failure from the hierarchical list of detected failures for said SAP as determined from the order of tests as described above. Along with a root cause analysis display, appropriate warnings and instructions are displayed to the user. This analysis is also logged and stored as a file in memory 114 for later reference or reporting or for forwarding to a service technician as required. At this point, the user is presented with additional advanced tools such as a routing table, port monitoring, SAP monitoring and standard OAM on-demand tests.

Note that the testing and display of results are controlled from the service platform 112 located at the service provider premise in order to ensure the security of network resources shared between customers of the service provider. The service application 112 creates and initiates all tests, carries out the tests on the live network and releases test resources when tests are completed. The testing is performed starting at the lowest level of hierarchy and proceeding to higher levels because errors at lower levels have a high probability of being the cause of errors detected simultaneously at higher levels. It this manner, embodiments of the present invention can determine the root cause of network errors with high probability.

A common provisioning error is incorrect MTU size (Maximum Transmitted Unit size in bytes) which must be respected across the network. As described above, embodiments of the present invention verify MTU size across network; verify access ports; verify service tunnels; and verify binding of service tunnels.

Figure 3:
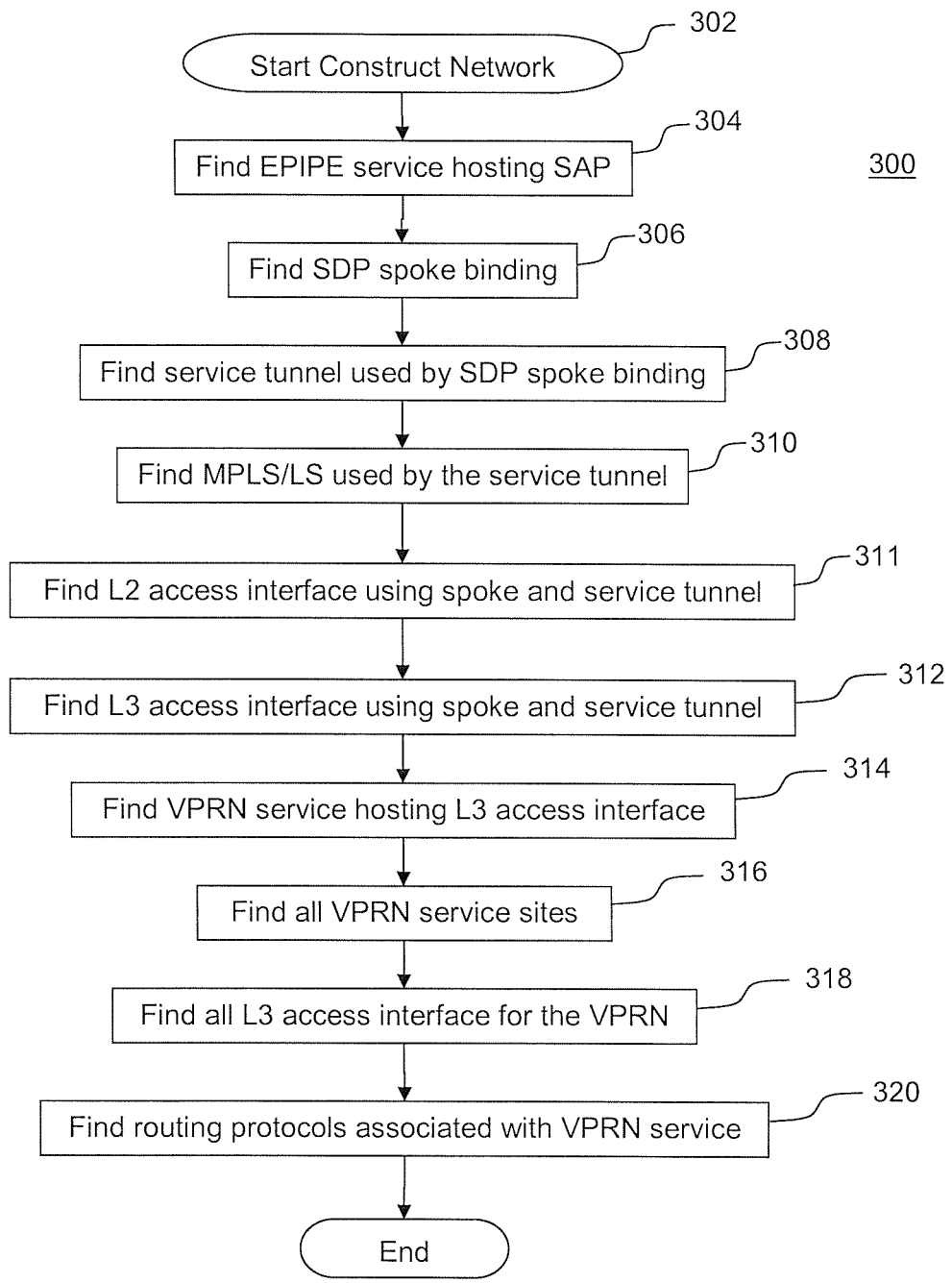
FIG. 3 illustrates a Construct Network Topology aspect of an embodiment of a method for determining a root cause of a failure in the embodiment of the network depicted in FIG. 1.

FIG. 3 illustrates further details of constructing the network topology aspect of an embodiment of the invention. At step 304, the service application 112 finds the Epipe service hosting the SAP. At step 306, the service application 112 finds the SDP spoke binding correlating the SDP to the Epipe service. At step 308, the service application 112 finds the service tunnel used by the SDP spoke binding. At step 310, the service application 112 finds the MPLS/LSP used by the service tunnel. At step 311, the service application 112 finds the layer 2 access interface using the same spoke binding and service tunnel as determined at steps 310 and 308. At step 312, the service application 112 finds the layer 3 access interface using the same spoke binding and service tunnel as determined at steps 310 and 308. Some networks will have layer 2 services or layer 3 services or a combination of both. The service application will therefore find layer 2 services and/or layer 3 services as appropriate.

At step 314, the service application 112 finds the VPRN service hosting the L3 access interface. At step 316, the service application 112 finds all the VPRN service sites for the VPRN service identified at step 314. At step 318, the service application 112 finds all the L3 access interfaces for the VPRN service identified at step 314.

At step 320, the service application 112 finds all the routing protocols associated with the VPRN service through system calls to the network management system 104. As would be understood by persons of skill in the art, various routing protocols can be implemented such as: Border Gateway Protocol (BGP) VPRN with associated RD and ASN; MPLS/LSP with SDPs using Generic Route Encapsulation (GRE) or LSP; Open Shortest Path First (OSPF);(Intermediate System to Intermediate System (ISIS) protocol; or static route.

Once the network topology is constructed, by identifying all the service objects end to end, related to the identified SAP in this manner, the system can proceed to step 208 of FIG. 2. Constructing the network topology automatically in this manner is advantageous especially in networks having fully meshed, multiple VPLS services and complex service concatenations.

Figure 4:
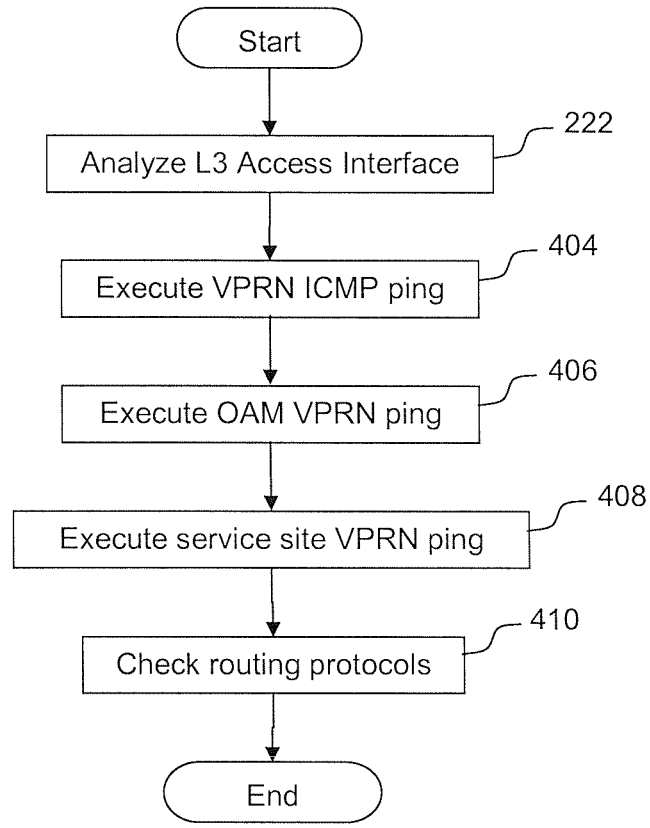
FIG. 4 illustrates an Analyze L3 Access interface aspect of an embodiment of a method for determining a root cause of a failure in the embodiment of the network depicted in FIG. 1.

FIG. 4 illustrates further details of analyzing the layer 3 access interface aspect of an embodiment of the invention. After the administrative state and operational state, alarms, and IP address associated with the layer 3 access interface is checked at step 222, the process continues to step 404 where the service application 112 initiates a VPRN ICMP ping from the layer 3 access interface to the customer equipment attached to the SAP and checks the result, to verify connection to the customer equipment.

At step 406, the service application 112 initiates an OAM VPRN ping from the layer 3 access interface to all other L3 access interface and checks the result. Note that in some embodiments, the VPRN ping can be executed by the network management system 104 under control of the service application 112.

At step 408, the service application 112 initiates a service site ping between the VPRN service site and all other VPRN service sites and checks the results.

At step 410, the service application 112 checks the routing protocols associated with the VPRN service, identified at step 320, for proper configuration across the VPRN service. The process then continues to step 224 previously described.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method of determining at a service device, a root cause of a failure in a packet switching telecommunications network, the method comprising:
   selecting a service access point (SAP);
   constructing, from a network-aware management system, a network topology map relative to said SAP, wherein the network topology map comprises a hierarchical list of detected failures determined from an order of tests starting at a lowest level of a hierarchy and proceeding to higher levels based upon a probability of errors being detected;
   analyzing the state of said SAP;
   analyzing a physical access port associated with said SAP;
   analyzing a virtual private network (VPN) service hosting said SAP;
   analyzing a service binding associated with said VPN service;
   analyzing a layer 2 access interface associated with said binding;
   analyzing a layer 3 access interface associated with said binding;
   analyzing all routing protocols associated with said VPN service;
   determining the root cause by selecting a lowest level failure from the hierarchical list of detected failures; and
   displaying a root cause analysis of said failure.

2. The method of claim 1, further comprising:
   determining an administrative state of said SAP;
   determining an operational state of said SAP; and
   determining an alarm state of said SAP.

3. The method of claim 1, further comprising:
   displaying a cause for a failure based on a hierarchical analysis of detected failures for said SAP.

4. The method of claim 1, further comprising:
   displaying to a user at said service device, a list of circuit identifiers configured on said network.

5. The method of claim 1, further comprising:
   finding the VPN service hosting said SAP;
   finding the service binding correlating the SAP to said VPN service;
   finding a service tunnel used by said service binding;
   finding a Multi Protocol Label Switching/Label Switch Path (MPLS/LSP) used by said service tunnel;
   finding the layer 3 access interface using said service binding and said service tunnel;
   finding a Virtual Private Routed Network (VPRN) service hosting the layer 3 access interface;
   finding all VPRN service sites for said VPRN service;
   finding all L3 access interfaces for said VPRN service; and
   finding all routing protocols associated with said VPRN service.

6. The method of claim 5, further comprising:
   analyzing said routing protocols for proper configuration across said VPRN service.

7. The method of claim 1, wherein analyzing the physical access port associated with the SAP further comprises:
   determining an administrative state of the physical access port;
   determining an operational state of the physical access port; and
   determining an alarm state of the physical access port.

8. The method of claim 1, wherein analyzing the physical access port associated with the SAP further comprises:
   checking a MTU size associated with the physical access port.

9. The method of claim 1, wherein analyzing the VPN service hosting the SAP further comprises:
   determining an administrative state of the VPN service;
   determining an operational state of the VPN service; and
   determining an alarm state of the VPN service.

10. The method of claim 1, wherein analyzing the VPN service hosting the SAP further comprises:
    checking a MTU size associated with the VPN service.

11. The method of claim 1, wherein the VPN service is an Epipe service.

12. The method of claim 1, wherein analyzing the service binding associated with the VPN service further comprises:
    determining an administrative state of the service binding;
    determining an operational state of the service binding; and
    determining an alarm state of the service binding.

13. The method of claim 1, further comprising:
    analyzing a SDP service tunnel when the service binding is down.

14. The method of claim 13, further comprising:
    analyzing a Multi Protocol Label Switching/Label Switched Path (MPLS/LSP) when the SDP service tunnel is down.

15. The method of claim 13, further comprising:
    analyzing a VPRN service site.

16. A system for providing a root cause of a failure in a packet switching telecommunications network, the system comprising:
    a network-aware management system in communication with said network;
    a service device in communication with said network-aware management system;
    a user interface that is configured to select a service access point (SAP);
    a service application on said service device that is configured to construct a network topology map relative to said SAP, wherein the network topology map comprises a hierarchical list of detected failures determined from an order of tests starting at a lowest level of a hierarchy and proceeding to higher levels based upon a probability of errors being detected, analyzes the state of said SAP, analyzes a physical access port associated with said SAP, analyzes a virtual service hosting said SAP, analyzes a service binding associated with said virtual service, analyzes a layer 3access interface associated with said binding, determine the root cause by selecting a lowest level failure from a hierarchical list of detected failures, and display a root cause analysis of said failure.

17. The system of claim 16, wherein said service application determines an administrative state of said SAP, determines an operational state of said SAP, and determines an alarm state of said SAP.

18. The system of claim 17, wherein said service application finds the virtual service hosting said SAP, finds the service binding correlating the SAP to said virtual service, finds the service tunnel used by said service binding, finds the MPLS/LSP used by said service tunnel, finds the layer 3 access interface using said service binding and said service tunnel, finds a VPRN service hosting the layer 3 access interface, finds all the VPRN service sites for said VPRN service, and finds all the L3 access interfaces for said VPRN service.

19. A non-transitory medium embodying a program of instructions executable by a machine to perform the method of claim 1.

* * * * *